US009760548B2

(12) United States Patent
Cooke et al.

(10) Patent No.: US 9,760,548 B2
(45) Date of Patent: Sep. 12, 2017

(54) SYSTEM, PROCESS AND METHOD FOR THE DETECTION OF COMMON CONTENT IN MULTIPLE DOCUMENTS IN AN ELECTRONIC SYSTEM

(71) Applicant: The University of Surrey, Surrey (GB)

(72) Inventors: Neil Edward John Cooke, Surrey (GB); Lee Gillam, Surrey (GB)

(73) Assignee: The University of Surrey, Surrey (GB)

( * ) Notice: Subject to any disclaimer, the term of this patent is extended or adjusted under 35 U.S.C. 154(b) by 118 days.

(21) Appl. No.: 14/361,812

(22) PCT Filed: Nov. 30, 2012

(86) PCT No.: PCT/GB2012/000883
§ 371 (c)(1),
(2) Date: May 30, 2014

(87) PCT Pub. No.: WO2013/079907
PCT Pub. Date: Jun. 6, 2013

(65) Prior Publication Data
US 2015/0033120 A1    Jan. 29, 2015

Related U.S. Application Data

(63) Continuation of application No. 13/307,428, filed on Nov. 30, 2011, now abandoned.

(51) Int. Cl.
*G06F 17/00* (2006.01)
*G06N 5/00* (2006.01)
*G06F 17/22* (2006.01)

(52) U.S. Cl.
CPC ...... *G06F 17/2211* (2013.01); *G06F 17/2217* (2013.01)

(58) Field of Classification Search
CPC combination set(s) only.
See application file for complete search history.

(56) References Cited

U.S. PATENT DOCUMENTS 5,963,666 A * 10/1999 Fujisaki ................. G06K 9/723
    382/187
7,668,814 B2 * 2/2010 Il ........................ G06F 17/30616
    707/756

(Continued)

OTHER PUBLICATIONS

Word Spotting and Recognition with Embedded Attributes Jon Almazán; Albert Gordo; Alicia Fornés; Ernest Valveny IEEE Transactions on Pattern Analysis and Machine Intelligence Year: 2014, vol. 36, Issue: 12 pp. 2552-2566, DOI: 10.1109/TPAMI.2014.2339814 IEEE Journals & Magazines.*

(Continued)

*Primary Examiner* — Michael B Holmes
(74) *Attorney, Agent, or Firm* — Renner, Otto, Boisselle & Sklar, LLP

(57) ABSTRACT

A computer-based detection tool for detecting whether content within a given document is common to content within a plurality of other, existing documents, the detection tool comprising: a character string recognizer for recognizing character strings in the content of the given document; a character string distinguisher for distinguishing main character strings and auxiliary character strings in the recognized character strings by reference to a closed list of main character strings; an encoder for encoding the content of the given document by assigning one or more digits to each main character string and one or more digits to auxiliary character strings; and a matcher for matching a plurality of n-digit streams from within the encoded content with any corresponding n-digit streams within previously-encoded content of the one or more other documents. The character strings may be encoded as a bit-stream.

23 Claims, 3 Drawing Sheets

(56) References Cited

U.S. PATENT DOCUMENTS

| | | | |
|---|---|---|---|
| 8,074,184 B2* | 12/2011 | Garside | G06F 3/04883 |
| | | | 382/186 |
| 8,301,893 B2* | 10/2012 | Brundage | G06T 1/0071 |
| | | | 713/176 |
| 8,413,045 B2* | 4/2013 | Lemonik | G06F 17/3089 |
| | | | 715/234 |
| 8,479,090 B2* | 7/2013 | Lemonik | G06F 17/218 |
| | | | 715/234 |
| 8,503,784 B2* | 8/2013 | Tanaka | G06K 9/033 |
| | | | 382/181 |
| 8,521,772 B2* | 8/2013 | King | G06K 9/00442 |
| | | | 235/375 |
| 8,619,287 B2* | 12/2013 | King | G06F 17/243 |
| | | | 358/1.15 |
| 8,655,074 B2* | 2/2014 | Kim | G06K 9/00456 |
| | | | 382/176 |
| 8,825,673 B2* | 9/2014 | Ravid | G06F 17/30705 |
| | | | 707/692 |
| 8,839,457 B2* | 9/2014 | Harris | G06F 21/62 |
| | | | 707/608 |
| 8,903,651 B2* | 12/2014 | Homma | G10L 21/0208 |
| | | | 701/419 |
| 9,280,529 B2* | 3/2016 | Lemonik | G06F 17/2288 |
| 9,356,574 B2* | 5/2016 | Denninghoff | H03H 9/02622 |
| 9,384,176 B2* | 7/2016 | Lemonik | G06F 17/218 |
| 9,405,740 B2* | 8/2016 | King | G06F 17/24 |
| 9,448,978 B2* | 9/2016 | Lemonik | G06F 17/3089 |
| 9,514,123 B2* | 12/2016 | Goel | G06F 17/277 |
| 2008/0033913 A1 | 2/2008 | Winburn | |
| 2015/0033120 A1* | 1/2015 | Cooke | G06F 17/2217 |
| | | | 715/271 |

OTHER PUBLICATIONS

VEDD—a visual wrapper for extraction of data using DOM tree A. K. Tripathy; Nilakshi Joshi; Steffy Thomas; Shweta Shetty; Namitha Thomas 2012 International Conference on Communication, Information & Computing Technology (ICCICT) Year: 2012 pp. 1-6, DOI: 10.1109/ICCICT.2012.6398114 IEEE Conference Publications.*

Integrity verification method of Thai content for faxed document Kharittha Thongkor; Thitiporn Pramoun; Chavinee Chaisri; Thumrongrat Amornraksa 2012 9th International Conference on Electrical Engineering/Electronics, Computer, Telecommunications and Information Technology pp. 1-4, DOI: 10.1109/ECTICon.2012.6254289 IEEE.*

Webpage Duplicate Detection Using Combined POS and Sequence Alignment Algorithm Mohamed Elhadi; Amjad Al-Tobi 2009 WRI World Congress on Computer Science and Information Engineering Year: 2009, vol. 1 pp. 630-634, DOI: 10.1109/CSIE.2009.771 IEEE Conference Publications.*

A genetic learning system for on-line character recognition B. Bontempi; A. Marcelli Proceedings of the 12th IAPR International Conference on Pattern Recognition, vol. 3—Conference C: Signal Processing (Cat. No. 94CH3440-5) Year: 1994, vol. 2 pp. 83-87 vol. 2, DOI: 10.1109/ICPR.1994.576880 IEEE Conference Publications.*

Increasing Robustness of Handwriting Recognition Using Character N-Gram Decoding on Large Lexica Martin Schall; Marc-Peter Schambach; Matthias O. Franz 2016 12th IAPR Workshop on Document Analysis Systems (DAS) Year: 2016 pp. 156-161, DOI: 10.1109/DAS.2016.43 IEEE Conference Publications.*

Unsupervised word segmentation from noisy input Jahn Heymann; Oliver Walter; Reinhold Haeb-Umbach; Bhiksha Raj 2013 IEEE Workshop on Automatic Speech Recognition and Understanding Year: 2013 pp. 458-463, DOI: 10.1109/ASRU.2013.6707773 IEEE Conference Publications.*

OCR Post-processing Using Weighted Finite-State Transducers Rafael Llobet; Jose-Ramon Cerdan-Navarro; Juan-Carlos Perez-Cortes; Joaquim Arlandis 2010 20th International Conference on Pattern Recognition Year: 2010 pp. 2021-2024, DOI: 10.1109/ICPR.2010.498 IEEE Conference Publications.*

Elhadi et al.; "Use of text syntactical structures in detection of document duplicates", Digital Information Management, 2008, IEEE, NJ, USA, Nov. 13, 2008, pp. 520-525.

Leanne Seaward et al.; "Intrinsic Plagiarism Detection Using Complexity Analysis", Sep. 10, 2009, www.uni-weimar.de/medien/sebis/research/events/pan-09/pan09-papers-final/seaward09-intrinsic-plagiarism-detection-using-complexity-Analysis.pdf.

Timothy Baldwin et al.; "Language Identification: The Long and the Short of the Matter", Human Language Technologies: The 2010 Annual Conference of the North American Chapter of the ACL, Jun. 2, 2010, pp. 229-237.

Arno Mittelbach et al.; "Automatic Detection of Local Reuse", Sustaining Tel: From Innovation to Learning and Practice, Springer Berlin Heidelberg, Sep. 28, 2010, pp. 229-244.

Neil Cooke et al.; "A high-performance plagiarism detection system", PAN 2011 Lab Uncovering Plagiarism, Authorship, and Social Software Misuse, Sep. 19, 2011.

Neil Cooke et al.; "Clowns, Crowds, and Clouds: A Cross-Enterprise Approach to Detecting Information Leakage Without Leaking Information", Cloud Computing for Enterprise Architectures—Computer Communications and Networks, Springer, NL, Dec. 1, 2011, pp. 302-322.

International Search Report for corresponding International Application No. PCT/GB2012/000883 dated Mar. 7, 2013.

* cited by examiner

SYSTEM, PROCESS AND METHOD FOR THE DETECTION OF COMMON CONTENT IN MULTIPLE DOCUMENTS IN AN ELECTRONIC SYSTEM

This application is a national phase of International Application No. PCT/GB2012/000883 filed Nov. 30, 2012 and published in the English language.

The present invention relates to detection of common content in documents, for example but not limited to, the detection of near-duplication and/or plagiarism or leaked information, managing documents by grouping into collections containing overlapping content and e-mail management.

Systems and methods exist which read content in one document, compare that content to content in an existing database of documents, match blocks of common content and identify matched content.

It is one aim of the present invention to provide an improved novel system, process and method for detecting common content in documents, and managing documents by grouping into collections containing overlapping content and e-mail management.

Existing techniques for detecting common text in literature broadly adopt a process of separating text characters (alphabetical symbols strung to form meaningful words) from non-text characters (punctuation marks, numbers, abbreviations and the like), minimizing spacing between characters, and then processing the remaining text using a sliding window.

The sliding window typically comprises a text fragment having a fixed number of words, characters or bytes, for example, eight words, and steps from one fragment to the next by a fixed interval of words, characters or bytes, for example, by one word. For each text fragment, a coding mechanism is used to generate a code unique to that text fragment, which is used to pattern match with documents contained within an electronic system of similarly processed documents. Commonly used coding mechanisms include fixed length Hash or Rabin's integer values. Such mechanisms typically generate a 32, 56, 64 or 128 digit bit for each character string.

Due to the sizes of the bits and sliding of the window using such coding techniques, for each fixed interval, there is an extremely large integer to catalogue and pattern match against existing electronic content. Whilst effective at recognising identical text, such techniques are by their nature computationally intensive, and therefore computationally expensive, both in coding and pattern matching. This can result in considerable time delays in the checking of documents against large collections of existing electronic content.

Furthermore, these existing coding mechanisms are brittle to change, as the smallest of differences in a character string will result in vastly different unique codes for character strings which might be, in actuality, near identical, and so some cases of substantial copying or slight misquoting will not be identified.

The present invention seeks to provide a novel system, process and method which is more computationally efficient than the prior art, resulting inter alia in speedier comparisons of content, and also to provide a more robust system and method which can reliably identify closely-related content which is not identical to existing content. It is a particular aim of the present invention to provide a Cloud/Crowd-based service for real time protection of intellectual property against those who leak, steal or plagiarize, and also to register and search intellectual property without revealing content but the system may also be used within a local server based eco-system.

In one aspect the present invention produces a binary stream representation of a text which enables minimal encoding of a text using one binary digit per meaningful character string, typically being a word. In one minimal binary representation, one digit is used for main content words and one digit is used for auxiliary content words, and binary pattern matching approaches then become readily applicable to entire documents or segments of documents of specified sizes.

Such a system, process and method allows for content matches to be generated without the need to disclose the actual content of either the source or the target document, thereby adding a novel and secure solution.

In another aspect the present invention provides a computer-based detection tool for detecting whether content within a given document is common to content within a plurality of other, existing documents, the detection tool comprising: a character string recognizer for recognizing character strings in the content of the given document; a character string distinguisher for distinguishing main character strings and auxiliary character strings in the recognized character strings by reference to a closed list of main character strings; an encoder for encoding the content of the given document by assigning one or more digits to each main character string and one or more digits to auxiliary character strings; and a matcher for matching a plurality of n-digit streams from within the encoded content with any corresponding n-digit streams within previously-encoded content of one or more other documents.

In a still further aspect the present invention provides a method of detecting whether content within a given document is common to content within a plurality of other, existing documents, comprising the steps of: recognizing character strings in the content of the given document; distinguishing main character strings and auxiliary character strings in the recognized character strings by reference to a closed list of main character strings; encoding the content of the given document by assigning one or more digits to each main character string and one or more digits to auxiliary character strings; and matching a plurality of n-digit streams from within the encoded content with any corresponding n-digit streams within previously-encoded content of one or more other documents.

The present invention is more versatile than prior existing systems, processes and methods, in that it is able to identify close, but not identical, content, which is not easily picked up by the prior art. In tests, the present invention has proven to be naturally robust against single character (letter) changes, multiple character (letter) changes, such as misspellings and/or the substitution of character strings (words).

In particular, the use of binary encoding for the main and auxiliary content avoids much of the computationally intensive effort adopted in prior art encoding systems. The simplicity of binary encoding further reduces the pattern matching computations, which are required to detect minor variations, such as misspellings or word substitution, as compared to the prior art.

In addition, the use of binary encoding has been found to be sufficiently lossy as to render the content of the original document practically unidentifiable from the encoded document owing to the very many variants of auxiliary character strings and main character strings that can be substituted for the binary digits in the encoded document.

In the present invention, only the source and position of the matched windows in already-encoded documents is identified, and thus neither the true content of the assessed document nor that of the matched document need be disclosed. This lends the present invention to applications such as checking for leaks of confidential or sensitive information, as well as plagiarism detection amongst publicly-available literature. Indeed, fingerprints could be readily, openly shared without revealing the content of any individual document.

Some specific embodiments and applications of the invention will now be further described.

Near Duplication/Plagiarism

Near duplication and plagiarism takes many forms, and may have a variety of legal and moral consequences. Near duplicates can be an issue for efficient storage and for version control for written documents, computer programs and system configuration. Within a centralized system, such issues can be readily addressed by assessing document-to-document similarities, finding best matches and showing differences. When using decentralized systems, where only eventual consistency may be expected, there may be multiple possible current versions.

Detection is similar, but resolving the version to retain may be problematic. In such situations, it is assumed that there is no intention to disguise the origins of the document, and that all documents are available within the network perimeter of an organization. A greater challenge exists when attempting to identify material duplicated from multiple, distinct, sources, and, in particular, when deliberate efforts have been made to try to disguise the duplication in order to prevent detection. Such kinds of disguised duplication can occur for reasons of:

1. Political posturing: a prime example being the so-called "dodgy dossier" which contained material lifted, with minor modifications, from the MERIA journal.
2. Grade enhancement: plagiarism of material from websites and other reference materials by students attempting to gain credit with minimal effort. Collusion or copying from other students, or purchasing essays from others are also common.
3. Career enhancement: plagiarism may occur even in members of the academic faculty, where publications are target-driven, rather than research-driven. If detected, the employing organization may be unduly protective.
4. Commercial advantage: relative costs and time taken in proving, for example, patent infringement, may entice companies towards using the intellectual property of one or more other organizations in the knowledge that the value attained is greater than the costs that would be incurred and the risk of detection.
5. Syndication: using source material without permission from the producers, where the material originates from a (trusted) agency, such as Reuters.
6. Website reputation: lifting material from other reputable sources in order to improve the hits on, and reputation of, a new website with a low search ranking.
7. Lazy reporting: routinely duplicated, revised and/or re-spun news articles, often within a provider, resulting in vast numbers of similar copies of a current or old story.
8. Self plagiarism: reuse of own published material in order to tell a similar, or related, story to another audience.
9. Opinion suppression: strategic duplication of material can dominate the discourse and give the impression of an absence of debate. For example, in political lobbying, through pre-written e-mail and near duplicate mass e-mail campaigns, the voice of individuals is effectively reduced; politicians simply "switch off" or get their aid to refine their SPAM filters.

Various issues of duplication, near duplication, unintentional versioning, copy look-alike and so forth, often arise because of the nature and scale of modern electronic media and reference material, and the perception of risk. The perpetrator either believes they will not get caught or that it is acceptable because it is done by everybody.

Most prior art plagiarism detection tools are web dependent, that is, only check that which is openly available (alongside that which has been submitted and stored). The scale of the web makes it difficult for search engine crawlers to index efficiently, and material plagiarized from the "deep web" may go undetected where prior art systems are unable to operate at this scale.

These prior art detection tools are also not suitable for plagiarism that occurs within a company, especially where this may concern:

Material stolen from an organization

Material accidentally released from an organization's private system

Potential self-plagiarism (accidental or deliberate), for example, through simultaneous submission to publishers of, say, journals and conferences both trade and academic The need to reveal the source document, or large numbers of clear text queries from the source document, and/or the target document makes such systems unsuitable.

Plagiarism detection tools typically rely on measures of document similarities ascertained by the number of shared normalized strings which are either sampled (fingerprints) or overlapping (shingles). Searches are made for pattern matches (shingles) against the index of electronic documents, or an heuristic assessment is made of similarities (fingerprints) against feature classified documents sets. The text parts which provide best returns are then brought to the attention of the checker, and a more detailed human analysis will usually occur but the system may be highly automated.

Shingling, an analogy to overlapping tiles on a roof, can allow for some word deletions, insertions and minor changes. Such document fragments are converted to a fixed length value. Shingling is an exhaustive approach used for identifying documents containing specific copied segments, with the extent of plagiarism given by the quantity of sequences of word-for-word matches (pair wise). Computing the fixed-length values is usually achieved using a Hash or Rabin's method.

The important characteristic is the flattening to give every resultant bit a 0.5 probability of change for a single input bit change. This makes every code in the full output range equally probable for any single bit change to the input, and this preserves the fingerprinting structure of the document without coloring with the bias of the flattening function, and allows indexing, random models and statistical assumptions to be applied to the near duplication problem.

Rabin's method is credited as the first approach in this field, and was initially used for a physical fingerprinting application. Rabin's method is computationally simpler than Hash-based flattening approaches: the result is roughly similar in flatness to Hash, that is, a fixed length number with a predictable collision probability, but Rabin's does not have the cryptographic "security" properties of a Hash.

The fingerprinting approach finds similar documents by means of combination of techniques such as the following:
- Resemblance and containment,
- Pairwise matching
- Content sensitive hashing:
  - Spot signature hashing
  - Inverse Document Frequency (IDF) feature selection for Rabin's signature
- Feature similarity:
  - Sentence length features
  - Syntactical POS features
- Cosine or Jaccard similarity measures, or other similarity measures
- Clustering analysis Exhaustive shingling approaches require one n-bit Hash or Rabin's calculation for every step and the index has to operate using the resulting fixed-length pattern, typically 32, 48, 64 or 128 bits in length depending on the application. As a result, creating a shingle set for a document is expensive, both in terms of memory and computation, and indexing shingles is equally expensive.

Non-exhaustive, i.e. heuristic-based or sampled, approaches have advantages in reducing total processing as compared to the exhaustive techniques, and will scale better over the internet. These are best suited to cases where whole document plagiarism or duplication is suspected and they perform best with "in subject" material. Hence, their use with many web search engines to check for similarities with the search terms. People will often attempt to obscure or obfuscate plagiarized content. The flatness characteristic required for these approaches causes brittleness in the detection: single character or bit changes produce a completely new code for the shingle or fingerprint.

People can perform simple, yet deliberate, obscuring attacks, such as making spelling errors, using thesaural substitutions, and altering the grammatical structure without changing the meaning.

Defeats are possible because of the ways that these systems select the (set of) strings for comparison from a source document with some set of target documents. Typically, such strings are either a fixed number of characters or a fixed number of words in length and so alterations within any such strings in a source document will have an effect on matching. These strings are often hashed, and Hash collisions used to indicate similarities; low probability of collision is required to avoid false positives. Hashes may be efficient where large strings are involved, and reduce patterns of variant length to a single bit-space. However, while Hash collision has beneficial outcomes in matching, similarity of Hashes does not automatically indicate similarity of strings.

Various attempts have been made to reduce brittleness, including input options such as the "bag of characters", and robust Hash approaches. More specifically, for SPAM Hash identification, where there are significant obfuscation issues, systems are proposed to prevent random characters and other variations from defeating the Hash signature using chunked or sliding Hash codes. These chunked or sliding Hashes are a special application of the Hash computations—only small fragments or whole words are hashed, and special algorithms for mixing, overlaying and stepping are used to reduce fragility to minor textual changes.

This is not necessarily how the designers intended Hash algorithms to be used, and they require especially intensive mathematical processing capacity. Detection is achieved through pattern matching the hashed output, hence small chunks of text with short Hashes and small steps in text provide a finer output for better detection, but this is at the cost of increased computation and therefore expense.

When creating the fingerprint or shingle, the precision and robustness performance of a detector is impacted by:
- The size and stepping of the "bag of words"—large bags are more specific, longer steps are more coarse, and both are more brittle.
- The bit length, which affects precision—too short, and false hits due to random noise increase as the library increases in size; too long, and the benefits of length compared to the costs of handling long index codes are not necessarily achieved. This is because the entropy becomes significantly less than the bit length. Words tend to follow a Zipfian distribution, and doubling the corpus size does not double the vocabulary.

For both exhaustive and non-exhaustive approaches, preprocessing is required to remove document formatting, surplus white space and minor character variation, resolve uppercase/lowercase, use of hyphens, etc. Some approaches also filter certain words before shingling/fingerprinting.

These detection tools for plagiarism and near duplicates are not well suited for Cloud and Crowd approaches, either because of the computing resource required and hence the high computational costs becoming high actual costs, or because of a lack of robustness.

For a Crowd system, tools should have light computing resource requirements, be fast, and be naturally robust to minor variations. To be robust, this also implies that false returns will be higher, and so the system, process and method should also provide means to scale and optimize the detection criteria.

The detection system, process and method of the present invention can employ both Crowd and Cloud computing in near-duplicate and plagiarism detection. The Cloud component involves a core plagiarism detection service with an efficiency that significantly reduces the cost of the computation, and that scales readily to meet demand. A dynamic Community Cloud can be formed around this service. The core service system provides for access to public documents, which may have certain articles cached to Cloud storage. Matching services against public documents are then available on demand in the Public Cloud to allow for submission of one or more texts.

At a minimum, there need be no retention of source documents—only of derived bit patterns and association to the versions of certain information, the reference data, used in its production—which should help to resolve fair use discussions. However, asking for documents "in cleartext" and assuring organizations that there is no retention is likely to prove challenging.

In this case, using the novel system, process and method, an organization would be able to produce its own bit patterns and use these bit patterns to match against both the public data and the bit patterns created using the same version of the reference data for data of the other organizations within the Community Cloud; matches would be of likely interest to the parties involved, particularly when these are indicative of intellectual property (IP) issues.

At higher computational cost, an organization could also generate its own reference data—providing that it met specific criteria—and trigger other members of the Community Cloud to recode their collections against this reference data. Then, either the bit pattern for search would be run against this recoded collection inside the other organization, or the collection patterns and bit pattern could be submitted to the Public Cloud detection service for matching purposes, or to a Private Cloud equivalent.

In the present invention the Crowd is formulated similarly—a Public Crowd, and a Community Crowd. A Public Crowd can be joined by anybody on the Internet, and is likely to require monitoring for quality in a similar manner to that required for large public contributory resources, such as Wikipedia. A Community Crowd is a membership-based group, potentially bounded by some arrangement such as a Non-Disclosure Agreement (NDA), or comprising a federation of university employees or "Subject Expert" volunteers, and so on.

The Public Crowd can be used to establish match efficacy by evaluating the rates of false positives for relationships between public documents. This is a relatively bursty service that becomes necessary at intervals when the document collection increases in size beyond a specific threshold—whereby longer bit patterns may become necessary. The Public Crowd may also be used for authorship attribution and to track the evolution of documents.

The Community Crowd can be engaged in relation to determining the nature of the problem at hand in the event of a potential hit on a private collection. For example, University Crowds would collaborate to minimize plagiarism amongst students (and staff) and be able to exchange processed versions of documents amongst an Academic Crowd and into the Public Cloud, if suitable, or the Community Cloud, if access should be limited. Each member of the University Crowd could provide a server with an index of their own data and a published fair-use policy relating to students reports and papers. Community Crowd or Cloud index owners could set hit rates in accordance with their published policy and only respond to an enquiry should they believe that there are sufficient contiguous hits to merit an investigation by both parties, bearing in mind that neither can see another's original work.

In one embodiment the Public Crowd is tasked to trace the evolution of the Hansel and Gretel fairy story (FIG. 1). Source data exists on the web, and Cloud storage is used for the search engine indexes. Members of the Public Crowd can use the detection service to rapidly locate reasonable numbers of texts containing Hansel and Gretel.

The Public Crowd investigates the resulting hits, removes false positives, and researches remaining differences. In this embodiment the Public Crowd is only concerned with detection, and the Community Crowd will ascertain a course of action. For example, the Public Crowd may find copies of the fairy story where Hansel and Gretel have been replaced with Pete and Tracy and the Witch by a Clown.

The fingerprinting/shingling approach of the present invention can be applied to both Crowd and Cloud computing. Variation of both the range and length of recognized patterns can be used to reduce the likely number of false positives.

Advantageously, the present invention does not need grammatical knowledge, and does not require part-of-speech information.

In the present invention the compression algorithm is ideally linear, and, if convolutional, must decay within an acceptable synchronization period and ideally not introduce error extension, else the robustness performance against minor changes will be compromised.

The lossy compression properties referred to in cryptographic terms are the synchronization and error extension properties of Counter Mode Encryption (CTR) and Cipher Feedback Mode Encryption (CBF).

In one embodiment of the present invention compression is achieved by representing words from a defined set with binary 1 and all others with binary 0. Being linear, the compression retains a homomorphic relationship with the original text, and the compression, whilst not cryptographic, is sufficiently lossy that it is a one-way function like a Hash, but is not a cryptographic signature like a Hash.

Hence, this embodiment does not rely on cryptography, Hash or Rabin's methods, but is compatible for content computation purposes with them at a given grain. Typical plagiarism detection relies on chunked Hash-based methods and similar approaches. The present invention is compatible with these methods at a given grain, but has a much lower overhead of computation with a higher collision rate, making brute force attacks vastly more challenging.

Cloud computing can be used, enabling the provision of both fingerprinting and matching services on demand. The document fingerprints could either be entrusted to a secure Cloud service, or created using an internally hosted system, process and method.

In one embodiment Crowd computing is used to establish match efficacy by evaluating the generation of false positives for relationships between public documents, and, as the document (fingerprint) collection continues to increase in size, longer bit patterns may become necessary.

Crowd computing may also be used for authorship attribution and to track the evolution of documents—in both cases, looking for the true original, and deriving paths of derivation. Such an implementation is aimed at detecting persons who have leaked confidential or sensitive information, or otherwise plagiarized, for whatever reason and however obtained.

The present invention allows multiple competing enterprises to search for such leakage in each others' corporate repositories whilst not divulging the original content. In principle, the document fingerprints could be shared openly without revealing the content of any individual document, particularly if shorter bit patterns were used to generate likely external hits for subsequent testing.

Cloud computing will also enable a subscription-based plagiarism detection service with revenues directly associated with use. The present invention is efficient, in being able to produce results of analysis rather faster and on lower performance hardware than leading systems, effective, in being able to achieve top 5 scoring precision, recall and granularity at speeds 150 times faster than the top performing competitors, and is readily scalable to the number of users.

A Cloud-based service will offer cross-enterprise matching and provide for access to public documents, which may have certain articles cached to Cloud storage. In effect, this becomes a Community Cloud, with each participant needing to contribute derivatives of their data and paying for the running of the services.

E-Mail Attack

Despite increasingly strong security technologies, it is still possible to propagate specifically targeted attacks against enterprises. A targeted e-mail attack, for example, uses convincingly formed e-mails sent to employees who may have a desire to know more about others in their environs—authority of the source can be crafted through inclusion, as a signature, of a footer of the name and position, and using the (spoofed) e-mail address, of a relevant internal employee who would be able to distribute relevant information, for example, about the "salaries of all employees". The name and position information may be readily available on the web via the corporate website or professional/social networking sites, making such attacks easy to formulate.

Such content can appear sufficiently like standard business communications as to avoid being blocked by spam filters. Furthermore, with large proportions of spam e-mails now blocked, spam can exist and malware be propagated via other means including through spamming the web, with datasets of such efforts being readily available. Such threats rely on naïve employees requesting content and being misled by the results of a search engine.

Equally, naïve employees can also deal inappropriately with outgoing communications in various forms. This is demonstrated amply by the UBS bankers' e-mail to over 100 people disclosing the flotation price of General Motors, thought to have cost the UBS Bank some $10 m in fees, and also by a UK county council being one of the first to be fined for data breaches—£100,000 for sending two separate, and very sensitive, faxes to the wrong numbers. While both such events were apparently accidental, a particularly-potent threat is posed by the determined insider.

In all such cases as those above, the relative strength of technical and organizational measures in place for information security at these organizations would have been expected to be quite strong. Clearly there are failings: (i) in ensuring employees are aware of the importance and risk of certain kinds of information; (ii) in ensuring careful use of a familiar old technology, probably not considered to be a risk, where the employee or employees were likely attempting to propagate information expediently to the right parties; and (iii) in removable media governance, which appears to have failed through the actions of a determined person. However, it is highly likely that such leaks would have occurred irrespective of whether the data were stored in a Cloud system.

The predicament for any enterprise is the extent to which to be paranoid over which kinds of information security. An enterprise could strongly encrypt all of its information, but will need it decrypted at point of use unless such information can be usefully processed without revealing its contents, the premise of homomorphic encryption. Still, those with valid decryption keys who may want to read such information or do something more with the information "in clear" pose a potent threat. The issue for any computer system, Cloud systems included, is that the decryption key must become accessible alongside the data, wheresoever the data is hosted, and perhaps in an already compromised system.

Information leakages should always lead enterprises to reappraise their approaches to dealing with private and/or confidential information. Although it is not possible to prevent all kinds of human errors, it should be possible to reduce occurrences of certain kinds of mistakes.

One embodiment of the invention will provide subscribers with the ability to encode and upload their own collections into a shared resource against which other subscribers can compare other, similarly-encoded documents. Reports returned to subscribers will identify the source of a matched document in a manner that enables the uploading subscriber to identify it, and if felt appropriate, share a copy of the matched content with the other subscriber. Collection subscribers might find this beneficial to protect copyright in the works which they upload. Subscribers comparing against the uploaded collections are able to verify the originality of content in the assessed document. This provides a useful system, process and method with which academia can verify the originality of papers and theses submitted by students and business enterprises can trace potential IP leakage.

In a further application, a subscriber may host its own collection of encoded confidential or sensitive documents which is not available to the public. For example, outgoing e-mails and attachments from the subscriber may be similarly encoded and screened for unauthorised disclosure of commercial or sensitive content before external distribution.

E-Mail Filtering

An e-mail during its lifecycle may be copied into the draft folder, out folder, sent folder, received folder and various other folders depending on the setup. Also, every client and server relay point in the system will automatically receive and save a copy, which includes any attachments. This scheme causes significant storage duplication and impedes data mining exercises on an archive or snapshot of any e-mail system. The present invention can provide for near-duplicate detection as part of context sensitive filtering of e-mail, such as:

To reduce data processing (human or machine) and enforce consistent policy. By identifying the near-duplicate copy within e-mails, a policy can be enforced consistent with the first detection. This duplication can take many forms, some may be previously identified banners which should be ignored according to the policy. Some may be "in-body" copy parts of a reply to a previously approved e-mail; for this, the policy of the first e-mail applies and only the response part needs checking. Others may be more subtle, such as a sexist joke that has been distributed both by e-mail forwarding and by cut-paste-modify into an otherwise original e-mail; for this, the policy is to prevent further distribution.

To control or manage intellectual property release; to use near-duplicate detection to identify the source of an attached file or any cut-and-paste segment of a file that has been previously identified as containing intellectual property, so that its official status for release or distribution can be determined or managed.

To assist post-event analysis, metadata use to establish to-from chains of correspondence are frequently broken/fragmented by different e-mail server settings and proxies, cut-and-paste to new e-mails, and also forwarding to new individuals. The present invention enables common segments of text to be identified and these e-mails to be linked as a common thread based on the content, and not metadata. E-mail filters are normally concerned with ensuring that e-mails are free from viruses, worms and other forms of system attacks, and with preventing the acceptance or propagation of spam and latterly of phishing attacks.

The main focus of e-mail filters is inbound, and for inbound e-mail protection there is a war of attrition, and one can but marvel at the game-playing approach and the continued inventiveness of the aggressors: spammers and phishers. Companies are implementing commercial SPAM filters at the same time that spammers are using the same filters to create e-mails that successfully pass the filters. The defeats spammers use can be surprisingly simple, such as variations of words that include mis-spellings, incorporation of "foreign" characters, and number substitution, where the results remain generally readable, e.g. Vieagra, Viägra, V1agra. Key word based approaches to spam filtering are also defeated by more complex approaches, such as the incorporation of text into images. A defence approach using collaborative filtering and 'robust' hashed central database approaches have proven variously successful against these issues. Such techniques, combined with white-lists and black-lists, Bayesian filtering and a host of other predictive and classificatory techniques, produce varying degrees of success in prevention of incoming e-mail based attacks.

Outgoing e-mail filters typically rely on the inbound filter technology, to both prevent egress of malicious code and content management, but this time the problem space is different: the number of 'Bad' e-mails is very small in comparison to the traffic, and the technology has to resort to using manually created specialised dictionaries and subject specific block/review lists. The Proofpoint product claims product leadership in this field; however, its technology is typical for the market. The present inventors have investigated the scale of the obstruction that such e-mail content and use enforcement systems would cause, and believe it to be both expensive and ineffectual, as a quick search of the commercial Enron e-mail corpus demonstrates.

Of some 517,431 Enron e-mails, 35,621 e-mails contain the word "confidential", indicating that up to 7% of all e-mails might be blocked in normal commercial correspondence. Of these 35,621 instances, previous work suggests that more than 50% are accounted for by e-mail confidentiality banners. Hence, for a classification marking, such as confidential, 3.5% of all outbound e-mails would be false positives; the remaining 3.5% would be merely suspected due to containing the key word "confidential".

If Enron-like correspondence is typical for BIS, then just for the key word "confidential", it would be anticipated that 1600 e-mails per working day would be blocked, and, of those e-mails, at least 50% would be banners. Across the entire UK government, just this one keyword for one large organisation in one country, this would extrapolate to around 57 million e-mails per year with concomitant costs and chaos associated to their processing. One can only imagine the business impact of a full selection of literal search words.

Most current e-mail policy enforcement systems are based on manually configured key word lists with reliance on humans to assess the context. These enforcement systems can be bought "off the shelf" with genre specific dictionaries, such as a medical dictionary, but still require expert consultation, configuration and tuning so as to suit the business requirements.

In these systems, the e-mail originator has no authority to release a blocked e-mail; they are reliant on the e-mail supervisor, hence usually have to phone and discuss to clear or speed up clearing the blockage. Sometimes originators are tempted to reword or delete/substitute/modify what they think are the key words and try again, and this course of action may lead to further issues.

To operate effectively, the online keyword checker needs to be within the corporate side of the Internet access defences, have all e-mail routed through it, and because of its role and the concentration of knowledge within it, it also requires protection from unwanted external or internal attack (both electronic and human). The usual method of operation and legal compliance is to inform the sender (on the corporate side only) of the blocking of the e-mail, and that it will be manually reviewed.

The corporate privacy problem is worse if the e-mail system is a "Software as a Service" (SaaS) solution, which is provided by a third party, and is hence not necessarily "on site". Here, these additional issues have to be protected through both contractual confidentiality arrangements, and appropriately secured virtualisation techniques. Filtering outbound e-mails for content management purposes relies on manually entered keyword lists and manually created disambiguation databases; our research and resultant novel innovation aims have been to improve context sensitive checking of outgoing e-mails by automatically separating different key word contexts by their usage, i.e. attempting to provide automation and better in context term selection. This leads to removing the false positives which occur with conventional keyword checking, and reduces need for or load on human checkers.

The nature of a context management systems search is really for a small percentage of 'Bad' e-mails in which the problem root is human; through: accidental, naive, negligent, or deliberate actions.

It is envisaged that the implementation of the system, process and method of the present invention will:
1. Reduce the need for expert consultancy and provide:
   a. Automatic extraction and clear presentation of different context usages of significant words.
   b. Clear feedback to the system administrator as to what keywords, keyword combinations, and contexts are present in the current e-mail archive, and what the impact would be should they be chosen to filter.
   c. Clear guidance on good discriminating words and words which would be a poor choice.
   d. Easy selection of test objects, and data structures for filter inclusion or exclusion in a manner that is agnostic to e-mail and document protocols.
2. For the user/originator provide:
   a. Additional clear feedback on the assumption of honest error,
   b. An opportunity for revision, which allows the originator to learn about the corporate policies in a natural manner,
   c. A process which clearly places the responsibility with the originator without over-dependence on the technology and not creating an environment of instrumentation dependence;

DETAILED DESCRIPTION OF THE INVENTION

Document Fingerprinting/Shingling

Figure 1:
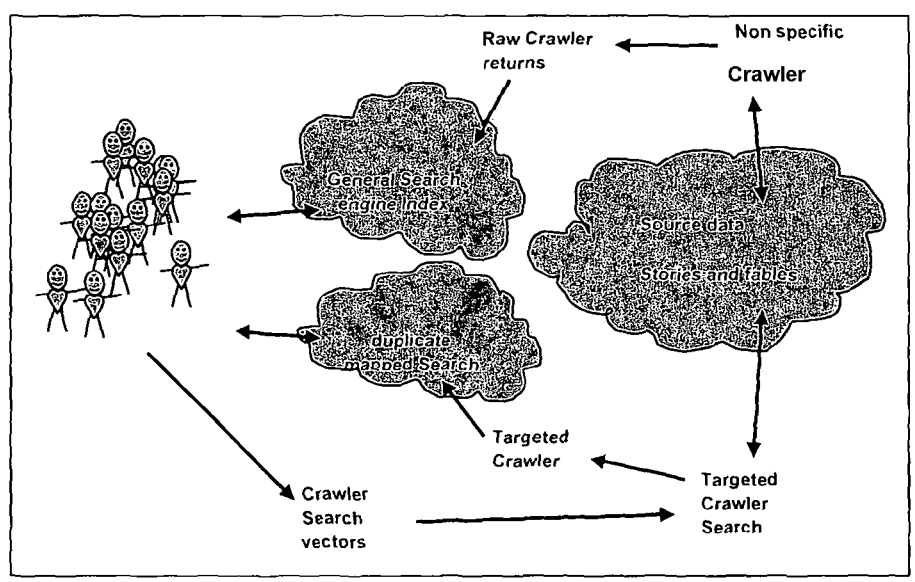
FIG. 1 represents steps in tracing of the evolution of the Hansel and Gretel fairy story.

In this technique a sliding n-bit window is used in the fingerprinting of documents, by creating an index which is keyed to a linked list and relates to information about the documents and locations within the documents.

A shingling approach is performed in the same manner, but would be more computationally exhaustive, in requiring an operation for each shingle fingerprint of the n-shingle. In this embodiment each word, both in the text fragment to be analyzed and the texts of documents to be matched, is represented by a single bit. As discussed above, this compression appears to be sufficiently lossy as to be considered private.

Document fingerprints, of any given length with respect to the number of likely hits generated, can be selected from the bit string for the text fragment to be analyzed. In one embodiment the sliding window has a defined length of n bits, for example, 32-bits, which corresponds to 32 words, and the sliding window is applied against each document to be referenced, by sliding the window at a defined step of n-bits, for example, with a step size of 8 bits, which corresponds to 8 words. In one such system, process and method the text fragment to be analyzed and the reference documents are subjected to standardised pre-processing, known as washing, and a standardized closed-class stopword list is created, which allows for the attribution of bits to the words in the text fragment to be analyzed and the reference documents.

In one embodiment washing involves at least lowercase conversion and translation of all non-word characters to whitespace.

In one embodiment the stopword list is formed as follows:
(1) A reference corpus, representative of the relevant natural language, such as the Brown Corpus, is chosen.
(2) This reference corpus is washed, in the same manner as described above.
(3) After washing, a word list is generated for all of the words in the reference corpus.
(4) After washing, the resulting corpus word list is ranked by ranking each word by the vocabulary of its collocations, in this embodiment according to a defined collocation window, for example, a −5/+5 collocation window.
(5) A stopword threshold is determined, where the sum of the cumulative frequency of the ranked words reaches a defined fraction of the size of the reference corpus, in this embodiment 50% of the corpus size. In this way, the dispersion properties are as evenly distributed as possible, as each member of this generated stopword list has the largest possible collocating vocabulary.
(6) A closed-class stopword list is then created which comprises those high-ranked words, these words representing main character strings and the other, remaining words representing auxiliary character strings.

For the Brown Corpus, the stopword list produced comprises 120 words. If the corpus size were to be increased, this list would grow very slowly due to the Zipf-like frequency distribution and Heaps law vocabulary behaviour. Hence, a stopword list of less than 200 words would meet a 50% threshold for a corpus of the size of the entire English language content of the internet.

In this embodiment this stopword list performs in a similar manner to common stopwords, such as "and", "the", etc, allowing random models to be applied, and an automated stop list is produced with a better correlation with the well-used Van Rijsbergen and Fox stopword lists than ranking by frequency alone. The Van Rijsbergen stopword list, which was originally generated on the basis of the Brown Corpus, represents approximately 50.4% of the Brown Corpus by volume. For the Van Rijsbergen stopword list and the top 120 stop list created in accordance with the present embodiment, the Baum-Welch algorithm provided representative mean entropies of 0.32 and 0.27, respectively, and both had the same characteristics, that is, via 100 trained Hidden Markov Models (HMM), from which 13 distinct, applicable, representative HMM were also obtained. This indicates that there are usable patterns within the distribution of stopwords for fingerprinting techniques to be applied, and also sufficient distribution to allow random models to estimate false hit performance.

In an alternative embodiment the stopword list could be specified by a user. In one embodiment all words on the stopword list which appear in any text are encoded with one bit kind, in this embodiment binary 1, and all other words are encoded with at least one other bit kind, in this embodiment binary 0.

By way of exemplification, the following opening lines of a well-known nursery rhyme, as a text fragment to be analyzed, is encoded as follows:
Mary had a little lamb,
It's fleece was white as snow,
Wherever Mary went,
The lamb was sure to go.

This text fragment was first washed to provide for lowercase conversion, and all of the non-word characters were translated to whitespace, giving the following washed text fragment.
mary had a little lamb
it s fleece was white as snow
wherever mary went
the lamb was sure to go The washed text fragment was then encoded in 21 bits using the present technique, where the words "a", "as", "go", "had", "it", "little", "sure", "the", "to", "was", "went" and "wherever" are stopwords in the stopword list and encoded with binary 1, and the other words are encoded by binary 0.

The encoded components of the text fragments were as follows:
mary had a little lamb 01110
it s fleece was white as snow 1001010
wherever mary went 101
the lamb was sure to go 101111

The cumulative 21-bit pattern was as follows:
mary had a little lamb it s fleece was white as snow wherever mary went the lamb was sure to go 011101001010101101111

This 21-bit pattern would be readily reversible with prior knowledge of the key words and their order, but might also indicate other phrases. By applying or sliding this window against each document to be matched at the defined step size, an index is created that uses the contents of the window as an address to a linked list which contains metadata identifying the document source and the location within the document, and also metadata identifying windows from other, already processed documents against which the document may be compared.

In this way, the window serves as an index address and is keyed with text metadata identifying the document and the position of the window without disclosing its content.

Both the window size and step size can be configured appropriately. In one embodiment the window size could be automatically tuned to a hit rate at a gross level, or according to each n-bit pattern, since the documents and locations are indexed. In an alternative embodiment one digit of a n-bit binary stream could be applied to all main character strings and remaining digits of the n-bit binary stream to subsets of auxiliary character strings.

In a further alternative embodiment a plurality of discrete stopword lists could be generated from a reference corpus, and digits of an n-bit binary stream assigned to the words of the respective stopword lists.

The sliding window is pattern matched against similar length windows in other catalogued documents. When a close match is found, the metadata with which the matching binary stream or streams is associated is reported.

The impact of this text fragment with respect to the Brown Corpus, in which the word "mary" occurs 97 times and the word "lamb" occurs 7 times, was then evaluated. This text fragment, nor any of its individual component lines, appear in the Brown corpus. The table below shows the number of hits in the Brown Corpus for each encoded line of the washed text fragment, as well as for the cumulative assemblies of the encoded lines.

| Phrase | Pattern | Number of hits Sliding/(sentence cut) |
|---|---|---|
| mary had a little lamb | 01110 | 25162/(2230) |
| it s fleece was white as snow | 1001010 | 13369/(301) |
| wherever mary went | 101 | 131385/(11431) |
| the lamb was sure to go | 101111 | 10155/(557) |

| Phrase | Cumulative Pattern | Cumulative Hits Sliding/(Sentence Cut) |
|---|---|---|
| mary had a little lamb | 01110 | 25162/(2230) |
| mary had a little lamb it s fleece was white as snow | 011101001010 | 357/(18) |
| mary had a little lamb it s fleece was white as snow wherever mary went | 011101001010101 | 62/(3) |
| mary had a little lamb it s fleece was white as snow wherever mary went the lamb was sure to go | 011101001010101101111 | 2/(0) |

As expected, short patterns produce a significant number of (false) returns. Using the whole 21-bit pattern, and a sentence start point using the top 120 stopword list, produces 2 sliding hits and zero sentence-bounded hits. Visual inspection confirmed that these were not instances of the rhyme.

The present technique provides a degree of natural robustness, insofar as the stopword list comprises common words used to glue the meaning of a sentence together, and substitutions for these words will tend to be to others in the same class, for example, so >thus, and spelling mistakes and variation are relatively infrequent in this set, for systematic typing errors such as "teh".

In addition, spelling errors and substitutions typical in human plagiarism will generally occur in words that are not in the stopword list, resulting in the same encoding if such changes are word-for-word.

For example, the text fragment:
Mary had a old lord.
His lords' reputation was true and fair.
when washed and encoded
mary had a old lord 01100
His lords reputation was true and fair 1001010
would be encoded identically to the text fragment:
Mary had a little lamb,
It's fleece was white as snow.
when washed and encoded
mary had a little lamb 01100
it s fleece was white as snow 1001010

Thresholds can be set in relation to the number of matching fingerprints for a document, or the number of reasonably-contiguous shingles, given the length of the bit-pattern.

The values for such thresholds can relate to document length, window length and step size. The table below illustrates 3-bit sequences produced from the Brown Corpus using the present technique.

| 3-bit Pattern | x00 | x01 | x10 | x11 |
|---|---|---|---|---|
| 0xx | 82,608 | 129,648 | 167,240 | 135,664 |
| 1xx | 129,648 | 173,256 | 135,664 | 69,513 |

As will be noted, there is considerable frequency variation, and also a large number of possible solutions. Hence, reverse-engineering a document using such information would present quite a challenge.

In order to establish false hit rates for pairwise matching, a model 200 million word corpus with random characteristics is utilized, such that Zipfian frequency distribution and Heaps vocabulary conditions hold, and this corpus is assumed to exist as one contiguous file to avoid the need to consider the additional per-document stepping.

From this model corpus, a stopword list is created which represents 50% of the corpus by size, and this stopword list is used to create the bit patterns for the whole corpus. Because it is difficult to calculate a 0/1 pattern match to true text on the basis of:
1=1/n stop words; and
0=1/potentially infinite open class words
it is assumed that there is only one valid hit in this random corpus and any additional hits would be false. This empirical view is taken because exact calculations require Heaps Law vocabulary calculations. Heaps law is essentially an expectation against a random Zipfian model, and the Zipfian model is an observation of behaviour which varies from corpus to corpus.

In this model corpus, a single 2-bit pattern, when single-bit stepped, would be expected to occur 50 million—1 times, and a single 3-bit pattern, when single-bit stepped, would be expected to occur 25 million—2 times.

The random hit formula is:

$$\text{Random Hits} = (\text{Corpus size in words})/2^n$$

Where n=search pattern length

For the Brown Corpus, the expected number of random hits against pattern length is shown in the table below, and is compared to our previous example where we know the text strings do not occur.

The table below shows that, for these short patterns, we are close to the false hit rates that we would expect assuming randomness. However, for longer patterns we appear to be getting more than we expect.

| Pattern | Pattern length | Predicted False hits | Actual false hits |
|---|---|---|---|
| 101 | 3 | 125,000 | 173,256 |
| 01110 | 5 | 31,250 | 26,561 |
| 101111 | 6 | 15,625 | 9,819 |
| 1001010 | 7 | 7,812 | 13,948 |

-continued

| Pattern | Pattern length | Predicted False hits | Actual false hits |
|---|---|---|---|
| 011101001010 | 12 | 244 | 357 |
| 011101001010101101111 | 21 | 0.47 | 2 |

Using this information, the length of the pattern in relation to the size of corpus can be set to match hit rate requirements.

To definitively confirm for 50 to 64 words requires Human Intelligence Tasking (HIT) to optimize the pattern match parameters, identify false hits and reasons, and collate document evolution metadata.

Using a random Zipfian model for a 200 million word corpus, a single 32-bit pattern representing 32 words of text will occur by chance about 0.05 times. Hence, the 32-bit index links of this corpus would be expected to contain 5% noise.

The scale of the internet web access provided by search engines, such as Google™ Yahoo™ and Bing™, are relatively shallow when compared to the true size of the whole World Wide Web in all its forms. The unseen part is often referred to as the "deep web", and is estimated to be in the order of 5×1017 words.

If this deep web scale were to be applied, then a single 32-bit pattern representing 32 words of text would return approximately 232,000,000 hits; a 50-bit pattern representing 50 words of text (a small paragraph) would give approximately 450 hits and thus still require further post filtering to find the source data.

For a linked list index, rather than a single search, post-processing is still onerous as each 50-bit pattern in the index could contain 450 noise entries.

To obtain similar direct access performance as for our 200 million word example, the pattern would have to be extended towards 64 bits. The point being larger the corpus, the longer the search pattern needed to reduce false hits; this approach suggests 64 words of text to uniquely identify near duplicates or plagiarism/IP infringement at web scale. In a preferred embodiment the task would be sliced into significantly smaller relevant segments, each individually indexed.

In 2005, Google CEO Eric Schmidt estimated the "deep web" at 5 million terabytes (1012). Not all of this data is text, and the estimate assumes 8 bit words not text words.

However, assuming 5 characters per word average provides a 1017 text word upper limit for an internet corpus consisting of all languages. Providing a useful approximation for evaluating system performance, and particularly the bit pattern lengths needed for duplicates detection fidelity.

Also relevant to duplicate detection/search systems which use Google search or bag of words methods is the Wed1T5-gram corpus and provides useful insights into bag of words permutations. The Web1T 5-gram corpus is a Google dataset from 2006, derived from approximately 1 trillion (1,024,908,267,229) words (1012) of the web. Using the estimated average frequency for a whole internet hit count requires a multiplier of 105 with appropriate considerations for a Zipfian distribution and Heaps law on vocabulary. A 41-bit (Rabin or Hash) code (2,199,023,255,552) would be required to cater for all individual tokens, and hence the space for all n-grams. A 32-bit (Rabin or Hash) code, giving 4,294,967,296 of possible combinations, would easily represent all the grams due to the above cut-offs. However, such cut-offs would imply that a plagiarism detector would only detect already well-plagiarised materials. The implied 5 million terabytes would require 59 bit Hash or Rabin's codes—leaving headroom for modern 64-bit systems. However, assuming a 3-word bag system each 59 bit entry would have on average 1049×105 link list entries associated with it and a Zipfian distribution.

Taking the log (base 2) of predicted and actual false hits from results produced two straight lines with slopes of −1 and −0.89, and this is used to provide a better prediction for bit length and false return rate.

Random Hits=(Corpus size in words)/$2^{(n*0.89)}$

Where n=search pattern length

Some advantages of this novel near duplicates detection approach are:

Computation that is greatly simplified.
The binary pattern is generated directly at the first standardisation stage, giving significant speed benefits, of at least two orders of magnitude.
It has a natural robustness feature which is not present with Rabins and Hash approaches.
It is highly memory efficient and uses less resources than others.
The reverse index address length is selectable, to suit application or host requirements, whilst providing extremely fast (real time) indexing and search.
It only indexes the chosen language for which it has models and, as such is capable of performing other tasks related to language detection and extraction.
It is suited to a multi user Cloud or pipeline based application as well as private server.
For Cloud application, clients create 0/1 files of the text under investigation or reference; while servers hold indices of the 0/1 files and provide summary reports.
For pipeline application, each process can be serialised to suit streaming data or deep web searches.
It is suited to application engineering; an "application" is attached to an agent (previously was the client) and instructs the agent to tell the server what to do.
The "application" modifies agent/server outputs to suit demands. Most importantly for plagiarism or IP protection checking each work across a whole co-operative would take milliseconds instead of hours to check, and no intellectual property enters any other domain, nor is any revealed without controlled release by the IP owner. In the event that the stopword list were to be changed, either manually, or by considering a different representative corpus, or by adding to the corpus and regenerating the list, system precision may be impacted until the indexes are reset.

Multiple-Language Recognition

As described in the single-bit approach above, 1 is generated when a word is detected within a set and 0 is generated when the word is not in that set; main character strings and auxiliary character strings are identified within a document in using bit given some natural language resource which is either the set, or from which such a set can be produced by collocation statistics.

In a multiple language recognition system we have n lists; each list represents one of the languages and consists of the most frequent words with highest collocate vocabulary, produced using a cut off of 50% by volume. So, each list is representative of auxiliary character strings in one of the n languages. However, words (character strings) are not necessarily unique to any one language. Where a word is common to multiple languages, the language in which it is highest ranking (i.e. most frequently occurring) gets to keep it in its list. As a consequence, the language lists from which that word is deleted are now depleted, and so extra words are added to those language lists, such that 50% by volume is maintained. As the process continues for a bigger number of words common to multiple languages, word lists for each language become more distinct and a unique list is generated for each language.

Each language list is represented by a unique symbol, for example: English 01 (hex), French 02 (hex), German 03 (hex), etc, and a word not in any list is represented by the reserved symbol 00 (hex). Any code length may represent the symbol; in this example, the symbols use 8-bit codes, allowing up to 255 languages to be encoded, and a 16-bit code should be amply sufficient for many varieties of all known written languages.

If a word is not in any of the lists, 00 (hex) is generated; else a symbol is produced that represents the language. If the target document is English, then 00 and 01 are generated; for French, 00 and 02; for German, 00 and 03, and so on. In adding these codes, near duplicates can thus be detected and the most probable language of the matched documents can also be identified.

The approach creates code files that are n-times longer. The space occupied can be compressed to window length so that a contiguous language segment could be represented by a single 8-bit code or 16-bit code, with a reserved digit, say ff (hex) in 8-bit, for segments containing multiple languages that would require further processing.

The benefit is that 2n−1 languages can be encoded, near duplicate detected and recognized with the addition of a number of bits relevant to the window size required.

Concentrated Fine Grain Content Analysis

As described in the single-bit approach above, one binary bit, here binary 1, is generated when a word is detected within a set of stopwords and the other binary bit, here binary 0, is generated when a word is not in that set of stopwords; main character strings and auxiliary character strings being identified within a document using some natural language resource which is either the set, or from which such a set can be produced by collocation statistics.

In one embodiment a list of stopwords from a collection of text, typically a long list of stopwords, is sub-divided into sub-lists, optionally approximately equal by volume or arbitrarily, such as to provide for concentrated fine grain content analysis.

In one specific embodiment, using octal (3 bits), 7 digits, here digits 1 to 7 (001 to 111), are allocated to the stopwords within the respective sub-lists and 1 digit, here digit 0 (000), is allocated to stopwords which are not in these sub-lists. If using equal by volume sub-lists, each digit from 1 to 7 would represent 1/7 of the stopword list by volume.

In another specific embodiment, again using octal (3 bits), 1 digit, here digit 0 (000), could represent 50% of the corpus, and 7 digits, here digits 1 to 7 (001 to 111), could represent the remaining 50% of the corpus. This approach advantageously allows compatible runs with the above-described single-bit approach.

This concentrated fine grain content analysis offers a much finer encoding of documents, with the advantage being an ability to work with shorter runs and providing more information, and so generating fewer false positives.

Distributed Fine Grain Content Analysis

In one embodiment the words from a collection of text are sub-divided into sub-lists, optionally equal volume divisions (lists) of words, here comprising 8 volumes, where 7 digits, here digits 1 to 7 (001 to 111) represent 7/8ths of the whole language, and digit 0 (000) represents 1/8th of the whole language.

This distributed fine grain content analysis requires a significantly larger list in comparison to the above methods, but has an advantage as regards precision.

EXAMPLES

Example #1

The Brown corpus contains 7 proclamations of the form "In testimony whereof," with minor variations to dates and days. These proclamations are 42 words long, and, using the present encoding technique, produce the 42-bit pattern:
100110010101011011010010110110100010111010110100

Against the Brown Corpus using the Van Rijsbergen stopword list, this 42-bit pattern revealed 6 exact matches and 1 match with 1 difference, which was caused by the date "May" being a Van Rijsbergen stopword.

To ascertain how many words represents an offence we look to the PAN-09 Plagiarism Detection Workshop, where the smallest block of plagiarism in the test data is 50 words—roughly a paragraph in length.

Example #2

In this Example, a prototype Cloud-based system was created using a combination of C for the indexing and Java Server Pages (JSP) for presentation.

Initial indexing is run as an off-line process, with file-based patterns constructed first, and segments at the appropriate bit-length indexed across files subsequently. Initial Cloud-based tests were conducted on an Amazon Small Instance (m1.small), with 1.7 GB memory and using a 100 GB chunk of elastic block store (EBS) for data and result storage. However, scaling up to the Uncovering Plagiarism, Authorship and Social Software Misuse (PAN) Workshop 2009 dataset pushed us over the memory limit of such an instance. Rather than attempting to estimate the memory requirement, we detached the EBS, started an Amazon Large Instance (m1.large) with 7.5 GB memory, and tried again. Once more we hit a memory limit, so migrated similarly to a High-Memory Extra Large Instance (m2.xlarge) with 17.1 GB memory. The ability to transition between server sizes at such a rate, and not to have to invent new data handling approaches to fit within system limitations or to procure new systems, was highly beneficial to the time taken to conduct these experiments.

Indexing used 9 GB memory, and processed the 2009 external plagiarism corpus in 630 seconds. Comparatively high scores for recall and precision (0.38 and 0.70, respectively for the 2009 extrinsic corpus) were achieved in comparison to 10 other competitor systems. Additionally, the winning system in 2009 took 12 hrs, and the runner up reported a total processing time of 1 hr 14 mins using 64 GB RAM and 8×3 GHz cores server. In a second experiment, against the 2010 corpus, we consumed 17.4 GB RAM, processing took 26 minutes 30 seconds and achieved 0.39 recall and 0.96 precision, sufficient for a top 5 ranking in the 2010 competition against 18 competitors.

Example #3

For the PAN 2011 external plagiarism task, the system process and method was created and run as follows with the core method detection process requiring just 12 minutes. In this Example, a Cloud-based system was implemented with an Amazon EC2 instance and a 100 GB EBS volume, and utilized to perform the PAN 2011 external plagiarism task.

The AMI ID was used for the Canonical Ubuntu image, and ports 80 and 22 were open to allow for http and ssh traffic, with firewall rules set to limit traffic from required hosts as necessary, and keypair information as necessary to start such an instance. Ubuntu's Advanced Packaging Tool (APT) was used to install required external software libraries.

Language identification, in this embodiment TextCat software tool, was utilized to identify languages in the PAN data, and machine translation, in this embodiment Google Translate, was utilized to convert foreign language text to English, as the host written language.

In a first step, the languages in the PAN data were identified by language identification. Language identification requires each text to be processed, and runs at about 90 texts/minute in this embodiment. In this embodiment, on a single CPU, language identification took about 5 hours (26,000 texts~289 minutes) and resulted in some 890 texts identified for translation. As will be understood, language identification need only be undertaken once.

In a second step, for each foreign-language source text, the source files were translated by machine translation, and the translated texts replaced into the source files, noting size differences from originals by number of characters. In this embodiment, translating 890 identified texts took 5 hours 15 minutes. As will be understood, translation need only be undertaken once.

In a third step, the source files were indexed.

In a fourth step, the detection tool of the present invention was invoked to discover instances of plagiarism against the index. In this embodiment, detection required 12 minutes to process the entire collection. This speed is such as to allow various values of the different parameters to be tested quickly by iterating these steps.

In a fifth step, a stitcher tool was invoked to reduce granularity. In this embodiment, a blind stitching approach was employed, that is, which only uses metadata—filename, run length and position, with run lengths greater than a given size, within a maximum spanning distance, stitched into one run. In this embodiment, stitch time per run is approximately 30 seconds.

In a sixth step, competition XML was produced by applying cosine distance measures on the fly to validate passages. In this embodiment XML creation requires about 45 minutes per run in conversion, computation and filtering. Cosine calculations are used on short runs, with long detections implying high confidence, and tap the data during the conversion, so add minimal processing time. In this embodiment a fixed set of frequent words are used in determining cosine distances, and counts are prepared during mapping to save file overheads and avoid the cost of producing detection specific cosines.

In a seventh step, the competition XML was adjusted for offset and length information for translated texts, transforming character positions and counts in the ratio indicated by respective file sizes. In this embodiment this requires about 5 minutes per run.

In a final step, the results were presented.

Example #4

In this Example, content matching as described above is implemented as a system, process and method within a ribbon by application of an algorithm on a client, such as in a Microsoft Word ribbon implemented on a personal, tablet or mobile computer.

When a button is pressed on the ribbon, the application at the client encodes an identified document, in this case the open document, to a bit string ("010010 . . . "), and transmits this bit string to a server which supports the counterpart fragment matching application, in this case a Cloud-based server.

The server matches this encoded bit string with an encoded index, which has been previously generated using the same encoding approach as performed at the client, and transmits a response to the client that identifies the paths, for example, URLs, of the best matching set of documents, and the positions of these matches.

The client presents this response to the user, allowing the user to view each matched fragment aligned with the segment to which it is a possible match, thereby enabling a determination as to whether it is an accurate match or not.

Using this approach, at no point is the real content of the document being checked sent across any network, nor any coded fragments, such as Hashes, which could be more readily reverse engineered. One strength of the bit-string encoding is to provide a myriad of equivalent reverse possibilities, for example, meaning that "The cat sat on the mat", "Some donkeys ran across the beach", "In Afghanistan landmines are a risk" and "The corporate repository has been compromised" would all be equivalents, and longer passages make the likelihood of reverse matching yet more challenging.

Figure 3:
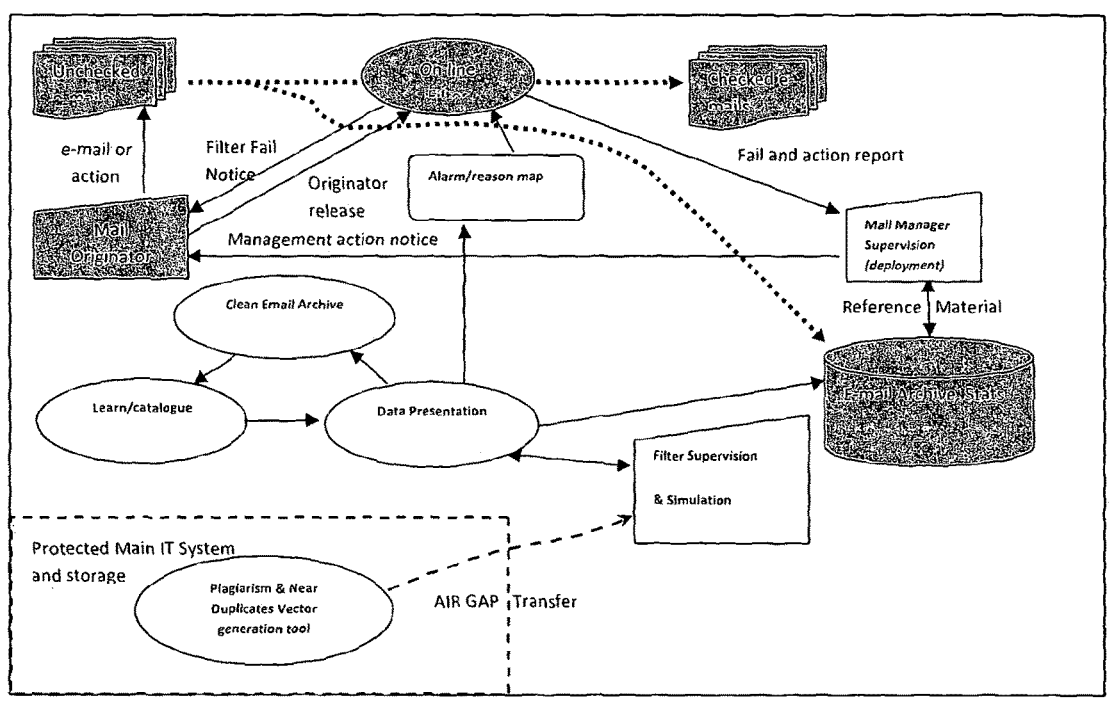
FIG. 3 represents an e-mail filtering system in accordance with one embodiment of the present invention.

FIG. 3 shows a context enhanced keyword filter in accordance with an embodiment of the present invention.

Figure 2:
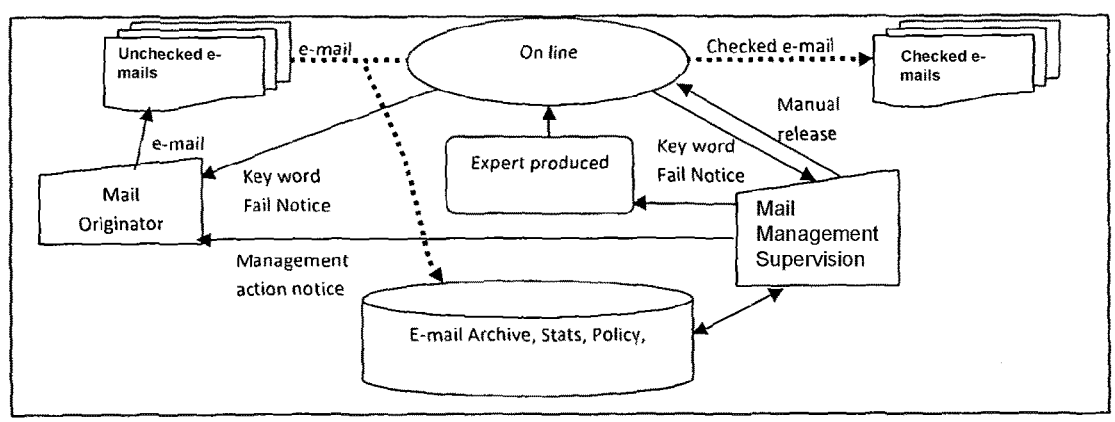
FIG. 2 represents an existing e-mail checking system.

The basic operation remains similar to existing keyword based filters (FIG. 2); however, instead of key words we now have an alarm map, which allows a more highly tuned approach to keywords and context where required.

The system process and method used to create the alarm map is a three stage process used in a standalone configuration so as not to impact the online e-mail systems.

1. The automatic preparation of a clean e-mail corpus uses the organisation's email archive as its base material; the cleaning is iterative and linked to feedback from the next two stages so as to exclude unwanted context objects from the learning stage.
2. Learning and cataloguing involves three main tasks: automatic identification of low entropy words ("stop words"); automatic ranking of high-interest words; automatic identification of clustering of high-interest words and disentanglement to identify context objects, regular terms, or regularly used idioms. This stage makes reference to a general language corpus.
3. Data presentation allows informed decisions to be made by the supervisor to select the keywords and terms into the various categories of interest. The key words are offered showing their usage, context relationships, and stop status. The alarm map is then sandbox tested against the e-mail corpus to show the effects of the changes. In this way, any interesting e-mails and attachments which were previously unseen are brought to the supervisor's attention, and ones that no longer alarm can also be reviewed. After the human review, the process is either iterated again with revised guidance or the alarm map is approved and issued to the online filter.

The data preparation phase consists of three main generic tasks, Cleaning, Learning/cataloguing/and "Secret" detection data preparation.

The corpus has to be clean of duplicates and boilerplate content such as machine added information structures before any natural language processing or language frequency analysis can take place.

Initial de-duplication is performed using the e-mail archives from/to and filing metadata, to produce a relational database equivalent of the e-mail archive. The e-mail Headers are extracted using a standard parser for Internet Message Format and MIME RFC's. The cleaning process then consumes the body content which consists of three types of information:

Text (Human information)

Mark-up (machine presentation and interpretation information)

Banners (e-mail disclaimer and other no format structure information inserted by e-mail server(s))

These are all preserved in an electronic system so that metadata can be exploited and the original e-mail reconstructed (including banners) for review, and each type is also de-duplicated using de-duplication processes.

The e-mails are then de-threaded, following reply and forward trails to further extract what was added or removed at each stage in that e-mail's life, and duplicate detection is used to find any broken threads (typically content copied and third party response emails). The purpose is to provide a clean relational database for the later analysis of a "social network" and its discourse. During this process any remaining mark-up language, e.g. HTML, is extracted using techniques outlined in Evert 2007; text delimiters and text are simplified to lowercase alphanumeric, and white space is also minimised. Finally, banner and other non-information context objects are extracted from the body content. These have to be learnt in previous iterations and are identified and extracted using techniques previously published by the inventors and also by duplicate detection of common objects as opposed to typical manual classification or sub-corpus classification and supervised learning approaches.

The system processes the text fields to automatically determine stop words, and identify high entropy words, terms, and small-context clusters. It also identifies large context objects and their associated word clusters. These are then structured and ranked, and optionally a general language corpus may be used to assist with ranking.

Where possible, the system compares objects with what it has already stored, for example, if it has determined that banners are not to be processed as part of the text, a new object that looks like a banner, due to semantic similarity, will be classified as such, and the supervisor informed.

The system also catalogues using techniques and approaches outlined elsewhere for language models, sentiment, terms, synonyms, social networks, and communications patterns, based on the de-duplicated discourse.

The data presentation phase performs a number of generic tasks which assist with the alarm map construction using a mix of metadata blocks, key word blocks, context object block descriptions, and near duplicate/plagiarism vectors, and also provides the interface for feedback for the system and the cleaning stages. It also presents:

the findings and associated cleaned e-mail corpus relationships using a generic built-in approach, and hence is a mechanism for CRISP-DM data understanding and evaluation phases.

information gained from e-mail metadata, including social networks, subject matter headings, auto-save category groupings, and process outputs for sentiment and dictionary based subject groupings such as social, medical, sexual etc.

Interfaced to the data presentation phase is the simulation and modelling tool set. This models the effects of any changes to the alarm map, and also the near duplicate/plagiarism vectors, by simulating blocked and unblocked content and comparing this to previous blocked e-mails and actions. The results of this can be used to adjust the vectors, alarm maps and other settings, and can also run these vectors on the e-mail corpus to determine the true and false alarm rates for both previously unauthorised and authorised transfers.

The optimised plagiarism vectors and alarm mappings are used by the deploy phase tool set. The plagiarism vectors are specifically designed to detect common patterns without need for reference to key content words. This is so that the intellectual property can remain both anonymous and off line from the e-mail checking systems unlike standard approaches. If a near duplicate/plagiarism detection event occurs, the user is informed and, where appropriate to policy, given the opportunity to correct. The e-mail supervisor is also advised of the event and causation. Should action be required, the supervisor can request either action by others or the release of information to allow the e-mail supervisor to investigate.

The near-duplicates system described so far has been used as a cleanup tool for the email database; however, it has another purpose. Our experiments have shown that human disambiguation of the concept "confidential" into banner and non-banner was a hard problem, though we have demonstrated that an AI program could learn to filter it. The AI program would learn this concept for two reasons, these being 1) the banners are highly frequent, and 2) the concept was highly constrained.

For intellectual property or Government protective marking, the problem is significantly different; the concepts of "secret", "confidential" or "privileged" are ephemeral, and by their very nature the text sources will be limited, with the language likely to be common with the organisations business. However, if we are dealing with an organisation, then by definition an organisation has structure and will likely hold their important Intellectual Property or protectively marked material in specific directories with access controls.

Our approach to intellectual property protection and prevention of "leaks" is to index those important files using the near-duplicates detector, then search for those files or "reasonably sized" fragments of those files in the e-mail system. Using file matching and near duplicates to control distribution is not a new concept, but it has issues: computation, brittleness and security. Hence, our search for a new approach which has processing and robustness benefits, plus security above that offered by chunked Hash indexes, which are vulnerable to known attacks. A benefit of our approach to near duplicates is that large indexes of small-chunked Hashes are vulnerable to known text attacks. Knowing one document reveals text in all text segments of all the other documents in the index that share that same small chunk, and this is a start point from which to begin unravelling all other Hash chunks. In the present system, this is not the case, as, when using a single bit, each binary 1 represents 120 or more stop words, and each zero a finite though substantially large number of words.

Multiple Languages

Whilst not intended exclusively for this purpose, the present invention is well suited to the comparison of text in documents written in natural languages. In such an application, the content is filtered or "washed" using already known methods to remove or ignore punctuation marks, and identifies individual words as individual character strings, by recognising spaces between strings.

The present invention can be pre-configured to recognise a defined set of auxiliary character strings, which can conveniently comprise one or more of articles, conjunctions, prepositions and pronouns of one or more natural languages to be analysed.

Desirably, the present invention is configured to recognise a natural language by reference to recognized auxiliary character strings. The present invention can then be configured to seek matches only in documents catalogued as being written in the identified natural language. In an alternative embodiment language selection can be input manually by a person submitting a document for analysis.

In one embodiment a window of defined length, for example, but not essentially, comprising 32 character strings, is configured to slide through the encoded binary stream at fixed intervals of, for example, 8 to 10 character strings. In its simplest form a window might comprise a single character string, that is, one word. The length of the window is adjustable and pre-defined by a user analysing a given document.

The present methodology does not use Hashes, language models or keywords. In the present invention, some pre-processing and word filtering is undertaken, and use is made of a fingerprint/shingle generator, which has a standardized output format, and an indexer.

A raft of controversy currently surrounds the Wikileaks website, which is making available the contents of some 251,287 US embassy cables captured by such a determined individual using a rewritable CD. This follows on from a previous Wikileaks release of some 90,000 classified US military documents. Such releases may damage public confidence and trust.

Each of these information leakage incidents demonstrates the relative ease with which confidential and/or sensitive information can find its way to unintended recipients and become problematic or costly for the controlling organization.

The cosine function added to the format tool so as to use the data available. The cosine function performed a comparison test against only the stopwords, not the content words. It's cut off is typically set to 0.9. It is estimated that the additional processing time was 10 minutes.

A major factor for high scoring in PAN competition is granularity, halving granularity would double the overall score. The fragmentation (granularity) is caused by the automatic obfuscation algorithms which alter the stop word patterns and shuffle blocks of text. The obfuscation algorithms consist of random text operations, the POSpreserving word shuffling and semantic word variation, described in. To improve granularity, a simple distance-only based stitching algorithm is utilized to join near adjacent short runs together into longer runs. The granularity post processing process took approximately 10 minutes, our initial results using a simple distance based algorithm and the test corpus reduced granularity from 6.79 to 4.20, further work is required to match the current competitor's granularity.

Each document is effectively indexed against its finger print; the finger print size is one bit per word of text. Our vision is of a plagiarism and near duplicate detection system which is a co-operative system operating on the web via Cloud-based resources. Each information owner in the co-operative maintains a fingerprint index of both their published and unpublished works and metadata with respect to release policies.

The purpose of the user-feedback system is twofold, being (i) to shift the vicarious liability to the originator, as the originator has been informed of the policy and has chosen to proceed, (ii) to give the opportunity to learn what not to say, further reducing false positives. It is understood that there is a risk that humans could learn opaque/veiled communication methods, but again it must be remembered that a primary assumption for good business practice is that that the majority are honest and have no intent to breach their organisation's trust in them. Likewise, training in office protocols and etiquette combined with good communications are all still required to embed best practice and responsibility with the originator or the forwarder for the content of the e-mail. In this vein, it is proposed that the system response to potential blocking events uses a response-message approach, as follows:

E-mail check has detected and highlighted words/phrases relating to potentially "offensive or discriminatory" material.
Would you like to:
a) Withdraw the e-mail,
b) Revise it,
c) Self approve it: in which case the e-mail will be sent, but also logged pending routine manual verification,
d) Forward it to: "DEPARTMENT NAME" for "advice" or "release approval":

E-mail check has detected and highlighted words/phrases relating to potential "80% match with document 597, which is commercial controlled" material.
Would you like to:
a) Withdraw the e-mail,
b) Revise it,
c) Self approve it: in which case the e-mail will be logged pending routine manual verification,
d) Forward it to: "commercial release authority" for "release approval"

Rule Configuration
Detect X [offensive], A [discriminatory], B [commercial]; C [accreditation level] . . . {These produce an explanatory string and a flag}.
Reason Y {explanatory string}, flag triggers:
Option 1
Option 2
Option 3
Option 4, route N(Y)

This approach triggering at the right frequency is significantly better than the irritating warning message used in some organisations for all outgoing e-mails:
"This e-mail is addressed to an external e-mail addressee, only UNCLASSIFIED messages may be released over this system, please press confirm to continue".
Or
"Your e-mail has been blocked until system administration has reviewed it, as it contains sensitive key word(s). During office hours System Admin will attempt to review and release it within the next 15 minutes, you need to do nothing. If your e-mail is urgent, or you need to have the e-mail released after office hours please ring . . . etc. . . . etc. . . . "

Finally, it will be understood that the present invention has been described in its preferred embodiments and can be modified in many different ways without departing from the scope of the invention as defined by the appended claims.

In one embodiment, particularly for short-length windows, a post filter can be applied to matches, such as a similarity-computation measure, for example, a Dice coefficient or c sine distance function on the auxiliary character strings, in order to confirm their precision, thereby assisting in reducing the occurrence of false positive matches.

In one embodiment, where multiple matches are found with a common source, such as having shared metadata, the matches can be blocked together so that the matches can be collectively retrieved or excluded.

In one embodiment corporate documents can be matched against public documents or documents of other corporates. An enterprise would create the required document fingerprints, and these document fingerprints would then be matched against both the public data and the fingerprints of other subscribers. Matches would be of likely interest to both of the parties involved, particularly if these are indicative of intellectual property (IP) issues, though the content of the matches would still remain to be revealed.

The invention claimed is:

1. A system, process and method for detecting whether content within a given document is common to content within a plurality of other, existing documents, the system, process and method comprising:
   a character string recognizer for recognizing character strings in the content of the given document;
   a character string distinguisher for distinguishing main character strings and auxiliary character strings in the recognized character strings by reference to a closed list of main character strings;
   an encoder for encoding the content of the given document by assigning the main and auxiliary character strings differently using one or more digits; and
   a matcher for matching a plurality of n-digit streams from within the encoded content with any corresponding n-digit streams within previously-encoded content of the one or more other documents.

2. The system, process and method of claim 1, wherein the documents comprise text written in one or more natural languages.

3. The system, process and method of claim 2, wherein the character string recognizer pre-filters the content of the given document to remove or replace any non-textual characters.

4. The system, process and method of claim 2, wherein at least some of the auxiliary character strings are pre-defined and comprise one or more of articles, conjunctions, prepositions and pronouns of the one or more natural languages.

5. The system, process and method of claim 2, wherein a plurality of sets of auxiliary character strings are pre-defined.

6. The system, process and method of claim 5, wherein the natural language of the given document is determined by reference to the respective set of pre-defined auxiliary character strings having greatest correlation.

7. The system, process and method of claim 2, wherein the closed list of main character strings comprises a list of stopwords and for at least one natural language, the stopwords are pre-defined.

8. The system, process and method of claim 7, wherein, for at least one natural language, the words within a reference corpus for the natural language are ranked by the vocabulary of collocations, and the list of stopwords comprises the highest ranked words constituting a pre-defined fraction (by volume) of the combined word frequency.

9. The system, process and method of claim 8, wherein the pre-defined fraction comprises 50% (by volume) of the combined word frequency.

10. The system, process and method of claim 1, wherein the matcher slides a window of n digits at an interval of m digits, where m is 1 or more, through the encoded content of the given document.

11. The system, process and method of claim 1, wherein the matcher post filters any matches to perform a similarity computation measure.

12. The system, process and method of claim 11, wherein the similarity computation measure consists of a Dice coefficient or distance function, such as cosine distance function performed on the auxiliary character strings within the matched content.

13. The system, process and method of claim 1, wherein the digits comprise binary bits and the encoder encodes the content of the given document in binary code by assigning at least one bit string of one kind to the main character strings and at least one other bit string of other kind to the auxiliary character strings.

14. The system, process and method of claim 13, wherein the encoder encodes the content of the given document in binary code by assigning a single binary bit of one kind (binary 0 or 1) to each main character string and a single binary bit of the other kind (binary 1 or 0) to each auxiliary character string.

15. The system, process and method of claim 13, wherein the bit strings each comprise a plurality of binary bits, representing a plurality of symbols.

16. The system, process and method of claim 15, wherein the bit strings comprise 3 bits, representing octal or 4 bits, representing hex.

17. The system, process and method of claim 13, wherein the encoder encodes the content of the given document in binary code by assigning the bit string representing one symbol to each main character string and the bit strings representing the other symbols to auxiliary character strings.

18. The system, process and method of claim 13, wherein the encoder encodes the content of the given document in binary code by assigning the bit strings representing symbols to pre-defined fractions of the reference character strings and where the pre-defined fractions of the character strings are approximately or substantially equal by volume.

19. The system, process and method of claim 1, further comprising:
   an indexer for indexing the encoded content of the one or more existing documents, wherein the indexer may comprise a sliding window of n digits which slides at a defined interval of m digits, where m is 1 or more, through each existing document to create an index which comprises an index address which is tagged with metadata identifying the reference document and the position of the index within the reference document.

20. The system, process and method of claim 1, wherein the character string distinguisher uses the Van Rijsbergen or other pre-defined stopword list to identify the auxiliary character strings.

21. The system, process and method of claim 1, wherein, in encoding the given document, the encoder assigns a different digit to each sub type of the main character strings and the main character strings are encoded using n digits, where n is in the range from 2 to 8 inclusive and n-1 digits are each used to represent 1/n by volume of a reference corpus and the 1 digit is associated with content which, when all auxiliary character strings are excluded, is not encountered in the reference corpus.

22. The system, process and method of claim 1, wherein the existing documents are in a plurality of different natural languages, each having a list of character strings comprising a pre-defined fraction by volume with highest collocate vocabulary in that language, and each list being representative of auxiliary character strings common to the language.

23. The system, process and method of claim 22, wherein, where an overlap occurs and an auxiliary character string is common to more than one of the languages, the language in which the auxiliary character string most frequently occurs is identified and the auxiliary character string in the list for that language retained and deleted from the lists in the other languages, thereby generating unique lists for the respective languages.

\* \* \* \* \*